(12) United States Patent
Hattori

(10) Patent No.: US 7,123,383 B2
(45) Date of Patent: Oct. 17, 2006

(54) DITHER PATTERN FOR IMAGE FORMING DEVICE

(75) Inventor: Hiroshi Hattori, Fuwa-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 676 days.

(21) Appl. No.: 09/726,454

(22) Filed: Dec. 1, 2000

(65) Prior Publication Data
US 2002/0051232 A1    May 2, 2002

(30) Foreign Application Priority Data
Dec. 6, 1999 (JP) ................................. 11-345772

(51) Int. Cl.
*H04N 1/405* (2006.01)
(52) U.S. Cl. ....................... 358/3.2; 358/3.16
(58) Field of Classification Search ................. 358/1.9, 358/3.2, 3.16–3.17, 3.06–3.14
See application file for complete search history.

(56) References Cited

U.S. PATENT DOCUMENTS 4,626,901 A * 12/1986 Tanioka ....................... 358/535
5,267,054 A * 11/1993 Chang et al. ................. 358/3.2
5,396,607 A * 3/1995 Shimatani .................... 711/219
5,778,158 A * 7/1998 Fujii et al. ................... 358/1.2
5,875,287 A * 2/1999 Li et al. ....................... 358/1.2
6,281,924 B1 * 8/2001 Tsuzuki ....................... 347/251

FOREIGN PATENT DOCUMENTS

| EP | 0 230 077 | 7/1987 |
| JP | A-62-159571 | 7/1987 |
| JP | A-11-27530 | 1/1999 |

* cited by examiner

*Primary Examiner*—Thomas D. Lee
*Assistant Examiner*—Stephen Brinich
(74) *Attorney, Agent, or Firm*—Oliff & Berridge PLC

(57) ABSTRACT

An image forming device according to the invention produces a continuous gray-scale image by using a dither matrix structured by orderly tiling a plurality of dither patterns. In each dither pattern, a plurality of gray level areas are arranged in the laser scanning sequence, in correspondence with the gray levels. Dither patterns are arranged in the dither matrix such that a gray level area at the end, with respect to a laser beam scanning direction, of at least one row of one dither pattern is adjacent to the next higher gray level area of another dither pattern. By the use of such a dither matrix, the image forming device forms dots continuously in the laser scanning direction, in correspondence with the gray levels.

20 Claims, 15 Drawing Sheets

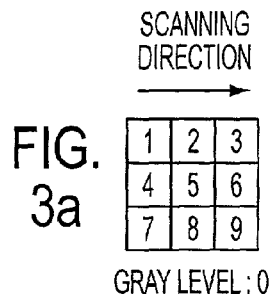
FIG. 3a GRAY LEVEL: 0
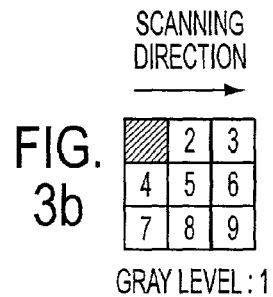
FIG. 3b GRAY LEVEL: 1
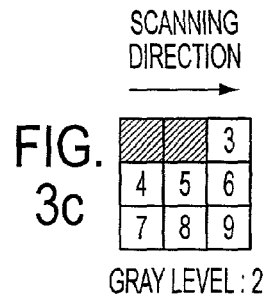
FIG. 3c GRAY LEVEL: 2
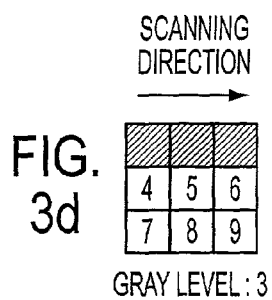
FIG. 3d GRAY LEVEL: 3
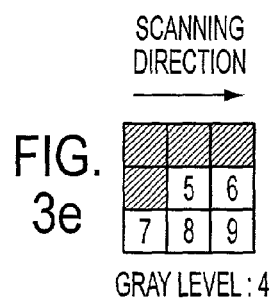
FIG. 3e GRAY LEVEL: 4
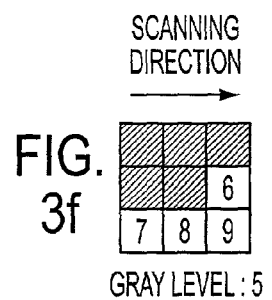
FIG. 3f GRAY LEVEL: 5
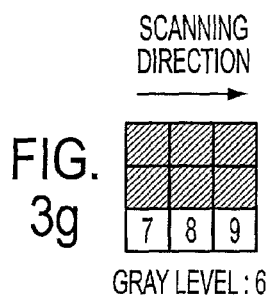
FIG. 3g GRAY LEVEL: 6
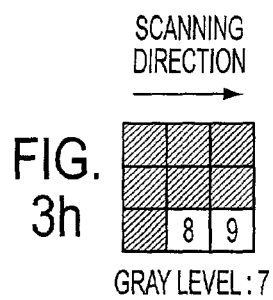
FIG. 3h GRAY LEVEL: 7
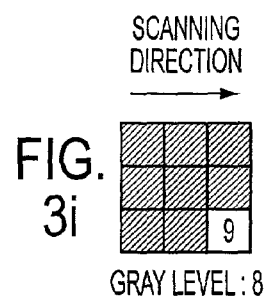
FIG. 3i GRAY LEVEL: 8
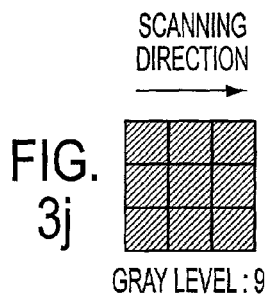
FIG. 3j GRAY LEVEL: 9

SCANNING DIRECTION →

FIG. 4

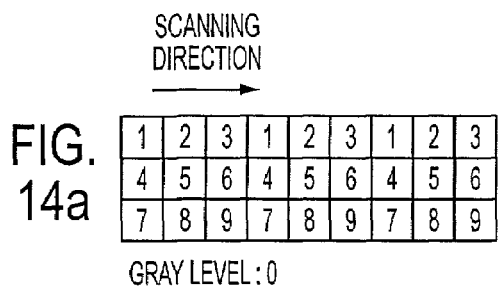
FIG. 14a  GRAY LEVEL: 0
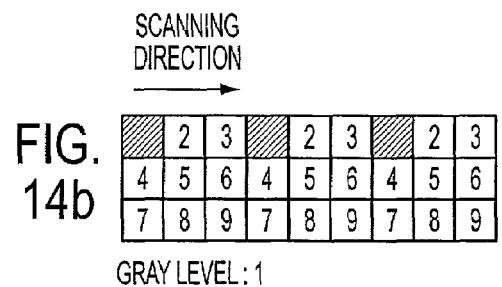
FIG. 14b  GRAY LEVEL: 1
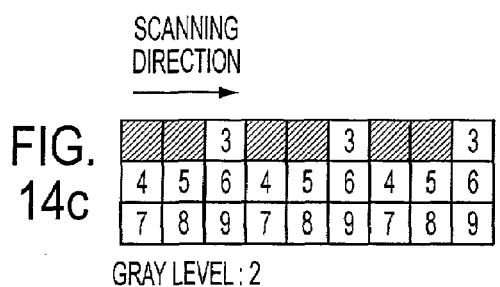
FIG. 14c  GRAY LEVEL: 2
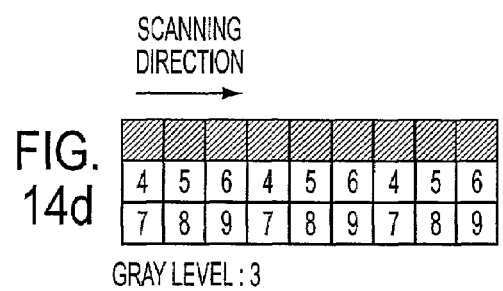
FIG. 14d  GRAY LEVEL: 3
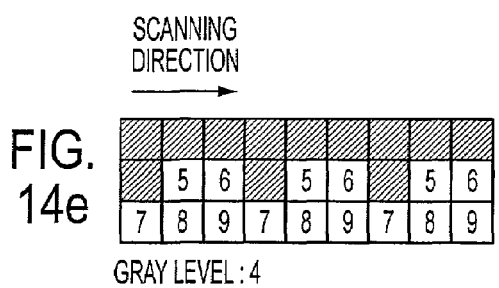
FIG. 14e  GRAY LEVEL: 4
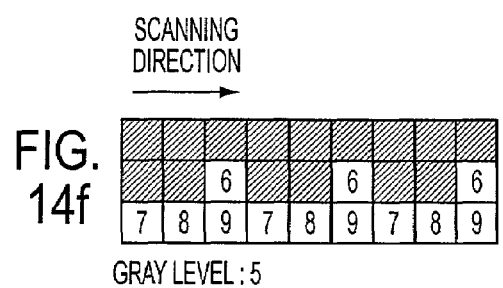
FIG. 14f  GRAY LEVEL: 5
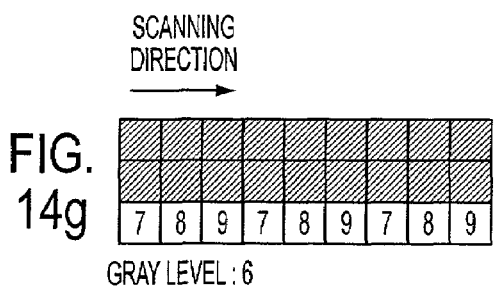
FIG. 14g  GRAY LEVEL: 6
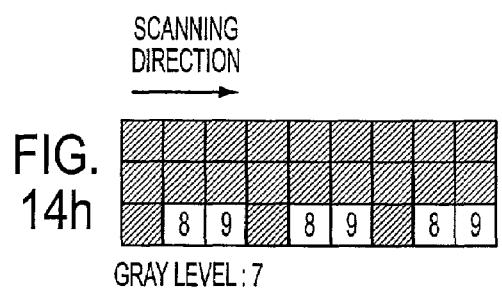
FIG. 14h  GRAY LEVEL: 7

SCANNING DIRECTION →
GRAY LEVEL : 8

SCANNING DIRECTION →
GRAY LEVEL : 9

DITHER PATTERN FOR IMAGE FORMING DEVICE

BACKGROUND OF THE INVENTION

1. Field of the Invention

The invention relates to an image forming device and, more particularly, to an image forming device that can produce a gray-scale image by using a dither pattern.

2. Description of the Related Art

Conventional image forming devices produce bi-level images by combining on and off dots. A dither pattern, in which a plurality of dots are orderly arranged, is known to provide multi-level gray scale printing and produce an image with smooth gradations of density.

A dither pattern includes a plurality of gray level areas arranged in a predetermined manner. FIG. 13 shows a square dither pattern having three rows and three columns of gray level areas. The dither pattern is divided into the 1st to 9th gray level areas. A plurality of orderly arranged dither patterns constitute a dither matrix. By processing predetermined gray-scale image data in such a dither matrix, a continuous gray-scale image can be produced.

As should be appreciated, the term "gray" applies to both monochrome and color images and to the density of both monochrome and color images.

FIGS. 14A–14J show dot forming states in accordance with the gray level values in the dither patterns or the dither matrix. As shown in FIG. 14A, when the gray level is zero, no dots are formed in any of the gray level areas of the dither pattern. As shown in FIG. 14B, when the gray level is 1, a dot is formed only in the 1st area. As shown in FIG. 14F, when the gray level is 5, a dot is formed in each of the 1st to 5th areas. As shown in FIG. 14J, when the gray level is 9, a dot is formed in each gray level area of the dither pattern.

As described above, the number of dots formed in each dither pattern increases/decreases depending on the corresponding gray level. Accordingly, the shades of gray of an image are determined and, as a result, a continuous gray-scale image can be obtained.

A high-quality image can be created when the dots are continuously formed. On the other hand, when the dot formation is temporarily suspended and then restarted, a poor quality image produced immediately after the suspension is created.

For example, in wire dot printers and ink-jet printers, a pressure at the restart of dot formation after a temporary suspension is lower than a steady pressure attained during continuous dot formation. Thus, the printers fail to produce a high-quality image immediately after the suspension.

Also, in thermal head printers, the temperature at the restart of the dot formation after a temporary suspension is lower than a steady temperature attained during continuous dot formation. Thus, the printers fail to produce a high-quality image immediately after the suspension.

The above-described problems are enhanced in laser printers. FIG. 15 shows a relationship among a laser beam control signal, a laser beam, and an image forming state. When a laser beam control signal is turned on, the intensity of a laser beam does not quickly rise to a threshold value that enables image forming. Instead, the intensity of a laser beam rises gradually to the threshold value. Toner only properly adheres to portions of a photosensitive body that have been exposed to a laser beam of a sufficient intensity beyond the threshold value where clear dots are formed. However, no toner adheres to the photosensitive body before the intensity of the laser beam reaches the threshold value after the laser beam control signal has been turned on. When continuous dot formation is temporarily suspended and then restarted, the intensity of the laser beam is below the threshold value. Thus, clear dots or a high-quality image cannot be produced.

As shown in FIG. 14E, when the gray level is 4, a dot is formed in each of the 1st to 4th gray level areas of the dither pattern. As far as the laser beam scanning direction is concerned, the 4th area is isolated from the 1st to 3rd areas. Prior to forming a dot in the 4th area, dot formation must be temporarily suspended. Accordingly, as described above, it is hard to form a dot in the 4th area.

As a result, the density attained when the gray level is 4 becomes slightly different from the density attained when the gray level is 3, but greatly different from the density attained when the gray level is 5.

Such a problem also occurs in the case, shown in FIG. 14H, where the gray level is 7. As shown in a plot of density versus gray level in FIG. 16, when the gray level is 4 or 7, the resultant density drops greatly below the gradient of a line and does not attain a density that matches the desired gray level.

Thus, the density does not change smoothly with changes in gray level and, as a result, a poor quality image is produced. When the gray level is 4, the density is particularly low compared with the density attained when the gray level is 7. The above-described problem becomes visually noticeable.

SUMMARY OF THE INVENTION

To solve the forgoing problems, the invention provides an image forming device that can produce an image with smooth gradations of density corresponding with various gray levels.

In various exemplary embodiments, the image forming device produces an image by using a dither matrix structured by orderly tiling a plurality of dither patterns. In each dither pattern, a plurality of gray level areas are arranged corresponding with the different gray levels. In the dither matrix, dither patterns are arranged such that a gray level area at the end, with respect to a laser beam scanning direction, of at least one row of one dither pattern is adjacent to the next higher gray level area of another dither pattern.

By using a dither pattern arranged as described above, a dot is formed continuously in the next higher gray level area following a dot formed in the gray level area at the end of the row. Thus, a clear dot is formed in the next higher gray level area. The use of such a dither matrix thus allows a clear dot to be formed after a temporary suspension of continuous dot formation.

Thus, a desirable difference in density is maintained between the gray level corresponding to the gray level area at the end of the row and the next higher gray level. As a result, shades of gray are produced corresponding with the gray levels and a continuous gray-scale image is obtained.

Further, dither patterns in the dither matrix are arranged such that at least a gray level area at the end of a row, of one dither pattern, that is referred to first for laser scanning, is adjacent to the next higher gray level area of another dither pattern.

With this arrangement, a dot is formed in the next higher gray level area continuously following a dot formed in the gray level area at the end of the first reference row. Thus, a desirable difference in density is maintained between the gray level corresponding to the gray level area at the end of the first reference row and the next higher gray level.

Further, gray level areas in each dither pattern in the dither matrix are arranged sequentially in the scanning direction, corresponding with the gray levels.

With this arrangement, dots are formed at any gray level in the gray level areas continuously in the laser scanning direction. Thus, a desirable difference in density is maintained between any two successive gray levels. As a result, shades of gray are produced corresponding with the gray levels and a continuous gray-scale image is obtained.

Further, dither patterns are identical in the arrangement of gray level areas with one dither pattern shifted from another dither pattern.

By shifting one dither pattern from another dither pattern, a gray level area at the end of each row of one dither pattern becomes adjacent to the next higher gray level area of another dither pattern. Thus, by the use of the dither matrix arranged in such a simple manner, a continuous gray-scale image is obtained.

Further, gray level areas in each row in each dither pattern are aligned sequentially in the laser scanning direction corresponding with the gray levels.

With this alignment, dots are formed in the gray level areas continuously in the scanning direction. Thus, a desirable difference in density between any two successive gray levels is obtained. In addition, gray level areas are arranged in a simple manner in the dither pattern.

Further, dither patterns are arranged such that a gray level area at the head of a row that is referred to first for laser scanning is adjacent, in a direction perpendicular to the laser scanning direction, to a gray level area at the head of a row that is referred to next.

With this arrangement, by only shifting one dither pattern from another dither pattern by one row, a gray level area at the end of each row, with respect to the laser scanning direction, becomes adjacent to the next higher gray level area.

Further, a dither pattern includes a rectangular portion made up of rectangularly arranged gray level areas, and at least one portion extending from the rectangular portion and made up of at least one gray level area.

When the dither matrix is constituted by such dither patterns, dither patterns are arranged obliquely in the dither matrix with respect to the laser scanning direction and a direction perpendicular to the laser scanning direction.

By the use of such dither matrix, dots are formed obliquely with respect to the laser scanning direction and the direction perpendicular to the laser scanning direction. Thus, even when the sheet conveying speed undesirably varies, an image is less affected by the variations in the sheet conveying speed.

In a typical laser printer, isolated dots are likely to be poorly formed because the intensity of a laser beam does not rise quickly to a level sufficient to achieve image forming after a laser beam control signal is turned back on. However, when the dither matrix according to the invention is applied to a laser printer, dots are formed continuously without being isolated from each other and thus clear dots are formed at any gray level. As a result, shades of gray are produced corresponding to with the gray levels and a continuous gray-scale image is obtained.

BRIEF DESCRIPTION OF THE DRAWINGS

An exemplary embodiment of the invention will be described in detail with reference to the following figures, wherein:

FIGS. 3a–3j show a dither pattern according to the exemplary embodiment of the invention;

FIG. 4 shows a dither matrix structured by a plurality of dither patterns shown in FIG. 3;

FIGS. 14a–14j show dot forming states in the dither patterns of the dither matrix shown in FIG. 13 when various gray level values are inputted.

DETAILED DESCRIPTION OF EXEMPLARY EMBODIMENTS

Figure 1:
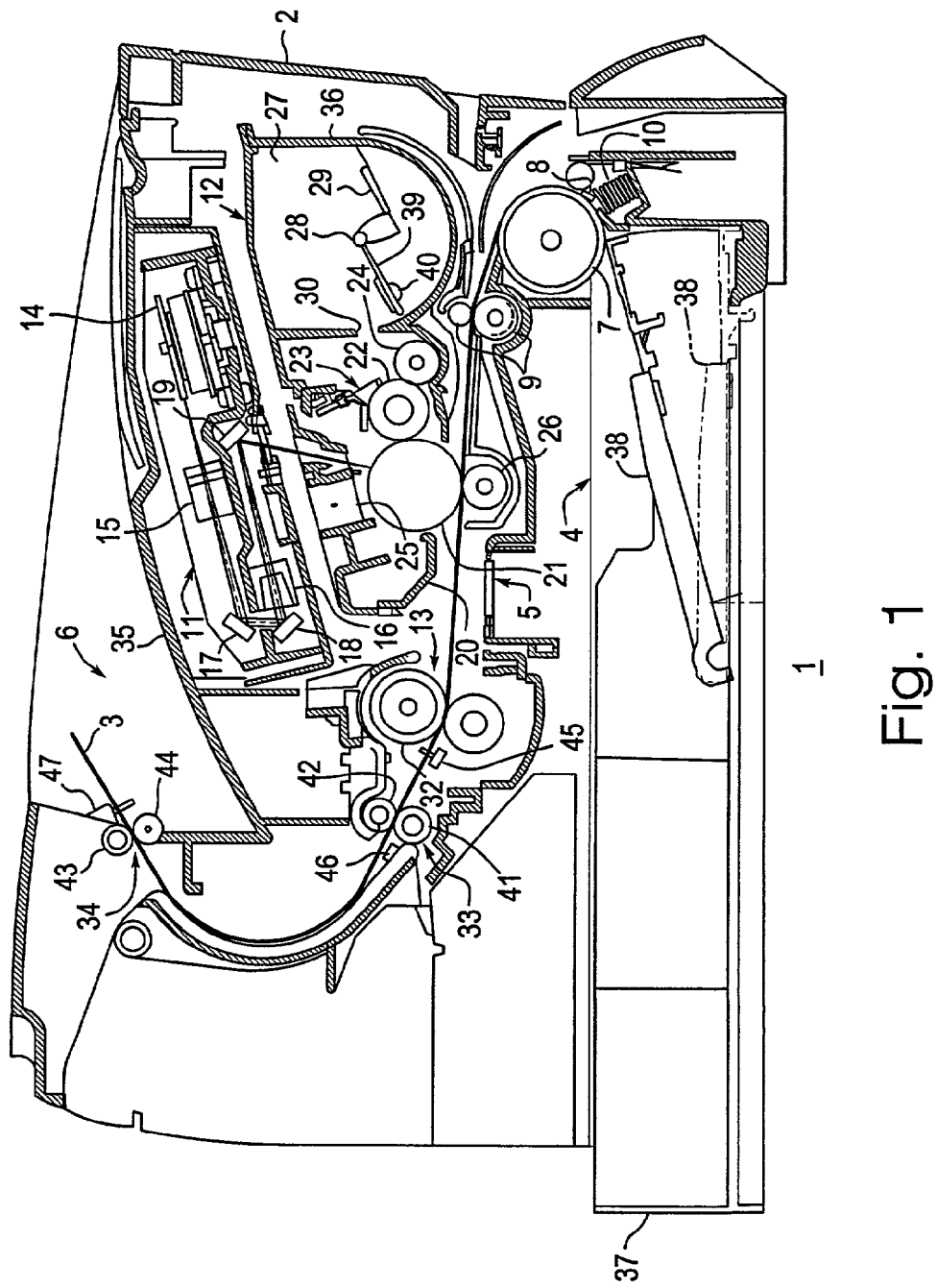
FIG. 1 is a side sectional view of a laser printer according to an exemplary embodiment of the invention.

FIG. 1 is a side sectional view of a laser printer, as an image forming device, according to the invention. In FIG. 1, a laser printer 1 has, in its casing 2, a feeder unit 4 for supplying sheets 3, an image forming unit 5 for forming a predetermined image on a sheet 3 supplied thereto, and a discharging unit 6 for discharging and stacking a sheet having a predetermined image thereon.

The feeder unit 4 includes a sheet feed cassette 37 detachably attached to a bottom portion of the casing 2, a pressure plate 38 provided in the sheet feed cassette 37, a sheet feed roller 7 and a sheet feed pad 8 that are provided above an end portion of the sheet feed cassette 37, and resist rollers 9 provided downstream of the sheet feed roller 7, with respect to the sheet conveying direction.

The pressure plate 38 allows sheets 3 to be stacked thereon. The pressure plate 38 is pivotally supported at its one end remote from the sheet feed roller 7, and vertically pivots at its other end closer to the sheet feed roller 7. The pressure plate 38 is urged upward from its reverse side by a spring (not shown). When the stack of sheets 3 is increased in quantity, the pressure plate 38 pivots downward about the end of the pressure plate 38 remote from the sheet feed roller 7, against the urging force from the spring. The sheet feed roller 7 and the sheet feed pad 8 are disposed facing each other. The sheet feed pad 8 is urged toward the sheet feed roller 7 by a spring 10 disposed on the reverse side of the sheet feed pad 8. An uppermost sheet 3 in the stack on the pressure plate 38 is pressed against the sheet feed roller 7 by the spring provided on the reverse side of the pressure plate 38, and is pinched between the sheet feed roller 7 and the sheet feed pad 8 as the sheet feed roller 7 rotates. After that, the sheet 3 is fed in, one sheet at a time. The resist rollers 9 are made up of two rollers, that is, a driving roller and a driven roller. The resist rollers 9 temporarily stop the sheet 3 conveyed from the sheet feed roller 7, and then convey the sheet 3 to the image forming unit 5.

The image forming unit 5 includes a scanning unit 11, a developing unit 12, and a fixing unit 13.

The scanning unit 11 is provided in an upper portion of an internal space of the casing 2. The scanning unit 11 has a laser emitter 54, a polygonal mirror 14, lenses 15, 16, and reflecting mirrors 17, 18, 19. A laser beam is emitted from the laser emitter 54 based on predetermined image data. Then, the laser beam sequentially passes through or is reflected by the polygonal mirror 14, the lens 15, the reflecting mirrors 17, 18, the lens 16, and the reflecting mirror 19 in this order, as indicated by a broken line. The laser beam is scanned over a photosensitive drum 21 in one direction perpendicular to the rotational direction of the photosensitive drum 21.

The developing unit 12 is disposed below the scanning unit 11. The developing unit 12 is made up of a drum cartridge 20 detachably attached to the casing 2 and a developing cartridge 36 detachably attached to the drum cartridge 20. The drum cartridge 20 includes the photosensitive drum 21, a scorotron charging device 25, and a transfer roller 26. The developing cartridge 36 includes a developing roller 22, a layer thickness-regulating blade 23, a supply roller 24, and a toner box 27.

The toner box 27 contains non-magnetic one-component toner, which is electrically insulative and positively charged. An agitator 29 provided within the toner box 27 is supported by a rotary shaft 28 provided at the center of the toner box 27. Toner inside the toner box 27 is stirred by the agitator 29 so as to be frictionally positively charged, and part of the positively charged toner is discharged from a toner supply port 30 provided on one side of the toner box 27. A remaining toner detecting window 40 is provided at a side wall of the toner box 27 and is cleaned by a cleaner 39 supported by the rotary shaft 28.

The supply roller 24 is rotatably provided adjacent to the toner supply port 30. The developing roller 22 is rotatably disposed facing the supply roller 24. The supply roller 24 and the developing roller 22 are in contact with each other so that their surfaces are press-deformed against each other to an appropriate extent.

The supply roller 24 is formed by covering a metallic roller shaft with an electrically conductive foam. The developing roller 22 is formed by covering a metallic roller shaft with an electrically conductive rubber material. The developing roller 22 is reverse-biased with respect to the polarity of electrical charges on the surface of the photosensitive drum 21.

The layer thickness-regulating blade 23 is disposed near the developing roller 22. The layer thickness-regulating blade 23 is formed by a silicone rubber disposed at a distal end of a metal plate spring. The silicon rubber is electrically insulative and has a semicircular shape in section. The blade 23 is pressed against the developing roller 22 by an elastic force of the plate spring.

Toner discharged from the toner supply port 30 is supplied to the developing roller 22 as the supply roller 24 rotates. After being supplied to the developing roller 22, toner enters a gap between the developing roller 22 and the layer thickness-regulating blade 23 as the developing roller 22 rotates. Toner is sufficiently frictionally charged and is formed into a thin layer of a predetermined thickness on the developing roller 22.

The photosensitive drum 21 is rotatably disposed on one side of the developing roller 22 so as to face and contact the developing roller 22. The photosensitive drum 21 is formed by covering the surface of a grounded aluminum cylinder with a positively charged organic photosensitive material mainly composed of a polycarbonate. The scorotron charger 25 is disposed at a predetermined interval upward from the photosensitive drum 21. The scorotron charger 25 produces corona discharge from a tungsten wire and positively charges the surface of the photosensitive drum 21 uniformly.

After being positively charged by the scorotron charger 25, the surface of the photosensitive drum 21 is exposed to a laser beam emitted from the scanning unit 11. As a result, portions of the surface of the photosensitive drum 21 that are exposed to a laser beam are reduced in electrical potential compared with other portions charged by the scrotron charger 25. Portions reduced in electrical potential are generated as an electrostatic latent image, based on a predetermined image data. When positively charged toner carried on the developing roller 22 comes to face and contacts the photosensitive drum 21 as the developing roller 22 rotates, the toner is selectively transferred and deposited onto the electrostatic latent image formed on the surface of the photosensitive drum 21. Thus, the electrostatic latent image is visualized. Visualizing an electrostatic latent image is generally described as development.

The transfer roller 26 is rotatably disposed below the photosensitive drum 21 so as to face the photosensitive drum 21. The transfer roller 26 is formed by covering a metallic roller shaft with an electrically conductive rubber material. A transfer bias, which is opposite in polarity to the charged photosensitive drum 21, that is, a transfer bias with negative polarity is applied to the transfer roller 26 in this exemplary embodiment. Therefore, toner held on the photosensitive drum 21 is transferred to the sheet 3 due to the transfer bias when the sheet 3 is passing between the photosensitive drum 21 and the transfer roller 26.

The fixing unit 13 is disposed on one side of the developing unit 12, that is, downstream of the developing unit 12, and has a heat roller 32, a pressure roller 31 pressed against the heat roller 32. The heat roller 32 is a hollow metal cylinder and incorporates a heating halogen lamp. While the sheet 3 is passing between the heat roller 32 and the pressure roller 31, toner on the sheet 3 is melted by heat from the halogen lamp and fixed onto the sheet 3.

The discharging unit 6 includes a pair of convey rollers 33, a pair of discharge rollers 34, and an output tray 35. The convey rollers 33 are made up of a driving roller 41 and a driven roller 42. The driving roller 41 and the driven roller 42 are disposed downstream of the fixing unit 13, with respect to the sheet conveying direction, and are facing each other so as to sandwich the sheet 3. The discharge rollers 34 are made up of a driving roller 43 and a driven roller 44. The driving roller 43 and the driven roller 44 are disposed downstream of the convey rollers 33, with respect to the sheet conveying direction, and are facing each other above the output tray 35 so as to sandwich the sheet 3. The output tray 35 is formed into a recess, above the casing 2, so as to allow the sheet 3 discharged by the discharge rollers to be stacked thereon.

Sheet sensors 45, 46 are disposed downstream of the fixing unit 13 and downstream of the convey rollers 33, respectively so as to detect a passing sheet 3. A discharged sheet sensor 47 is disposed downstream of the discharge rollers 34 so as to detect a discharged sheet 3.

After toner is fixed onto the sheet 3 by the fixing unit, the sheet 3 is conveyed by the convey rollers 33 and the discharge rollers 34 and ejected onto the output tray 35.

The laser printer 1 according to the exemplary embodiment can produce a continuous gray-scale image by using a dither pattern.

In a dither pattern, a plurality of gray level areas are arranged in a predetermined manner, in correspondence with the gray levels indicative of density levels. Upon an input of a gray level value, a dot is formed in each of the corresponding gray level areas according to the gray level value. A dither matrix is constituted by orderly tiling a plurality of such dither patterns. The number of dots formed in each dither pattern increases/decreases depending on the gray level value. Thus, an image with smooth gradations of density can be produced.

Described below is a method of producing an image with smooth gradations of density by using such a dither pattern.

Figure 2:
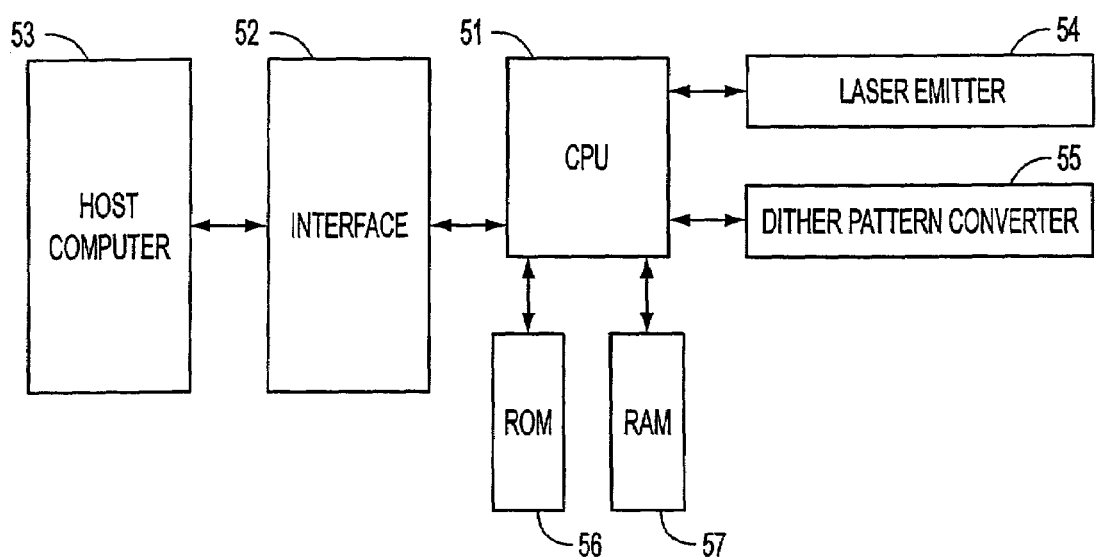
FIG. 2 is a block diagram showing a system configured to produce a gray-scale image by using a dither pattern.

FIG. 2 is a block diagram showing a system configured to control operations of the laser printer 1. A CPU 51 is connected to an interface 52, that receives data from a host computer 53. The CPU 51 is also connected to a laser emitter 54, a dither pattern converter 55, a ROM 56, and a RAM 57.

The laser printer 1 uses a dither pattern shown in FIG. 3. The dither pattern is square and has nine areas arranged in three rows and three columns. The 1st to 9th areas are defined as gray level areas.

More specifically, gray level areas in the dither pattern are sequentially arranged in each row so as to accord with the laser beam scanning direction. The 1st, 2nd, and 3rd areas are aligned in order in the 1st row of the dither pattern. The 4th, 5th, and 6th areas are aligned in order in the 2nd row. The 7th, 8th, and 9th areas are aligned in order in the 3rd row. A number assigned to each row in which gray level areas are aligned corresponds to the laser beam scanning sequence. In other words, laser beam scanning is started with the first row.

The 1st area, which is the leftmost gray level area in the 1st row, and the 4th area, which is the leftmost gray level area in the 2nd row, are adjacent to each other in a direction perpendicular to the laser beam scanning direction. The 4th area, which is the leftmost gray level area in the 2nd row, and the 7th area, which is the leftmost gray level area in the 3rd row, are adjacent to each other in the direction perpendicular to the laser beam scanning direction. That is, the 4th area is directly below the 1st area, and the 7th area is directly below the 4th area. It is noted that the laser beam scanning direction is defined as a horizontal direction, the direction perpendicular to the laser beam scanning direction is defined as a vertical direction, or a sub-scanning direction, and upstream and downstream sides with respect to the laser beam scanning direction are referred to as "above" and "below", respectively.

In the laser printer 1 that prints using the dither pattern, upon an input of a gray level value indicative of the dot density, a dot is formed in each of the corresponding gray level areas.

For example, when the gray level is zero, no dots are formed in any gray level areas of the dither pattern, as shown in FIG. 3a. When the gray level is 1, a dot is formed only in the 1st area, as shown in FIG. 3b. When the gray level is 5, a dot is formed in each of the 1st to 5th areas, as shown in FIG. 3f. When the gray level is 9, a dot is formed in each gray level area of the dither pattern, as shown in FIG. 3j.

Figure 4:
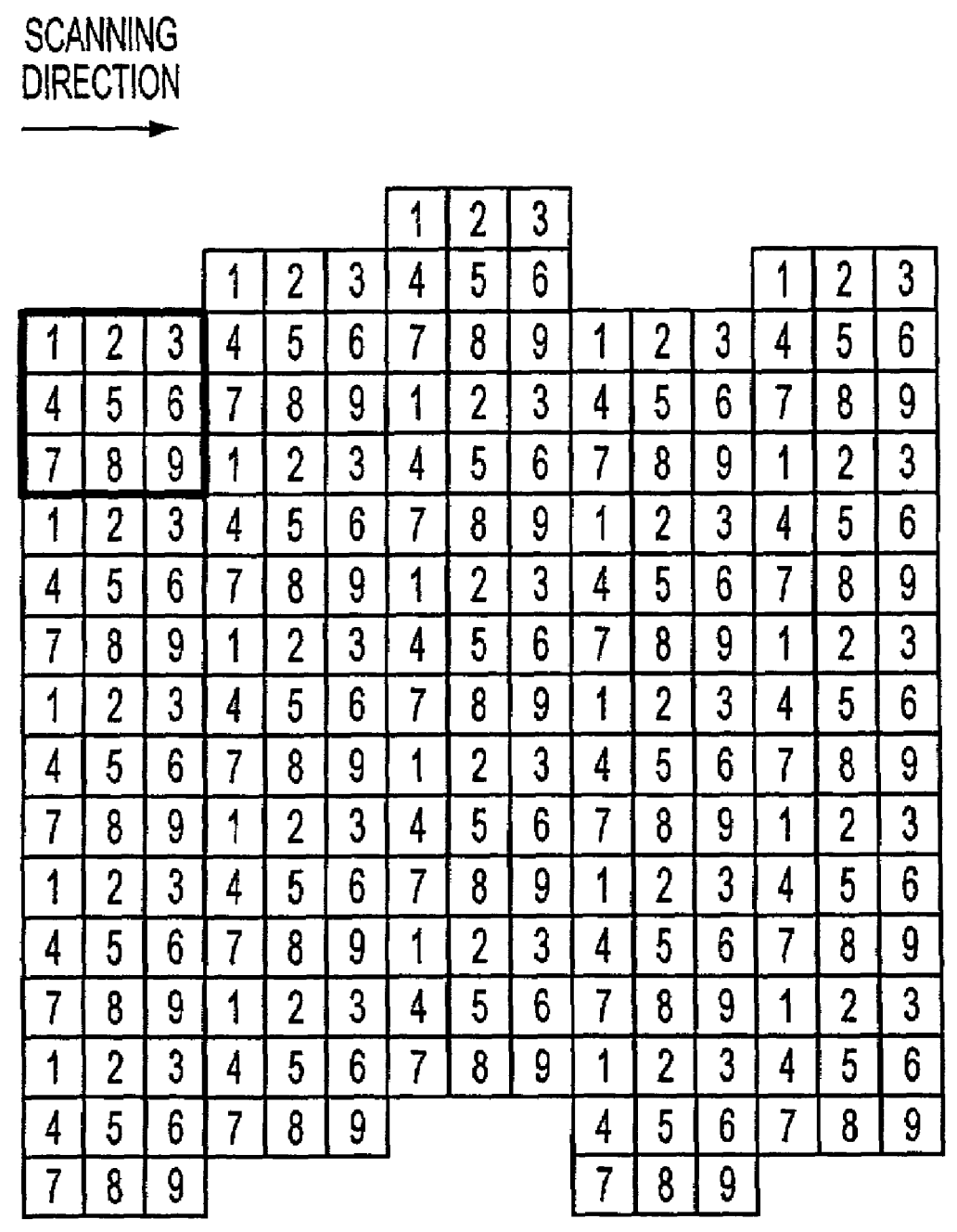

A dither matrix is constituted by tiling dither patterns, which are identical in the arrangement of gray level areas, such that one dither pattern is shifted from the horizontally adjacent dither pattern by one row. For example, as shown in FIG. 4, the 3rd and 6th areas at the rightmost in the row of a first dither pattern are placed so as to be adjacent to the 4th and 7th areas of a second dither pattern, respectively. In addition, the 6th area of the second dither pattern is placed so as to be adjacent to the 7th area of a third dither pattern. By tiling a plurality of dither patterns repeatedly in this way, a dither matrix is structured.

The host computer 53 inputs gray level values, which indicate levels of gray of an image, to the CPU 51 of the laser printer 1 through the interface 52. The dither pattern converter 55 processes the gray level values in the dither patterns to generate image data used for forming dots. The laser emitter 54 emits a laser beam based on the image data generated by the converter 55. The ROM 56 stores the dither matrix structured by tiling a plurality of dither patterns as described above. The RAM 57 has a gray level value buffer for storing gray level values inputted from the host computer 53.

Figure 15:
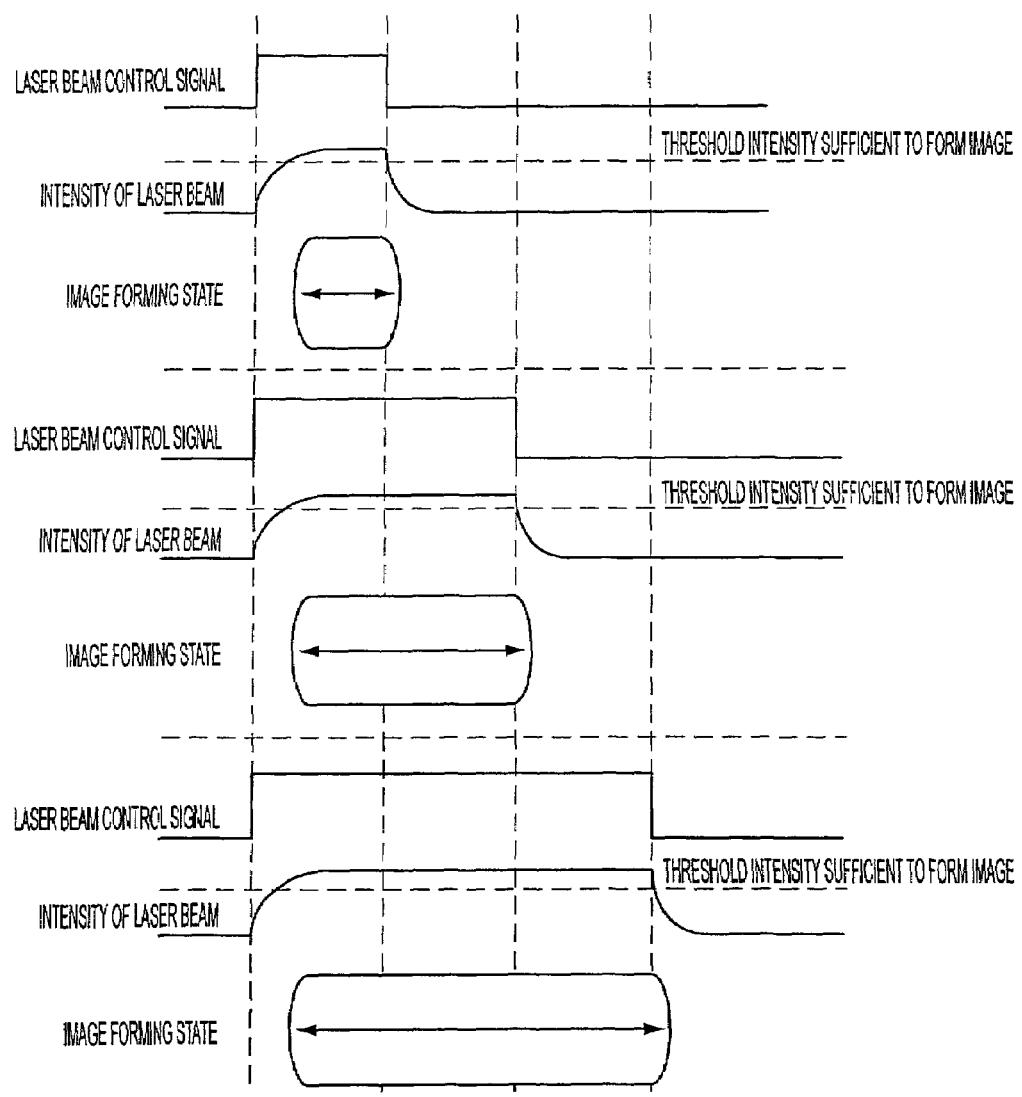
FIG. 15 is a diagram showing a relationship among a laser beam control signal, the intensity of a laser beam, and an image forming state.
Figure 16:
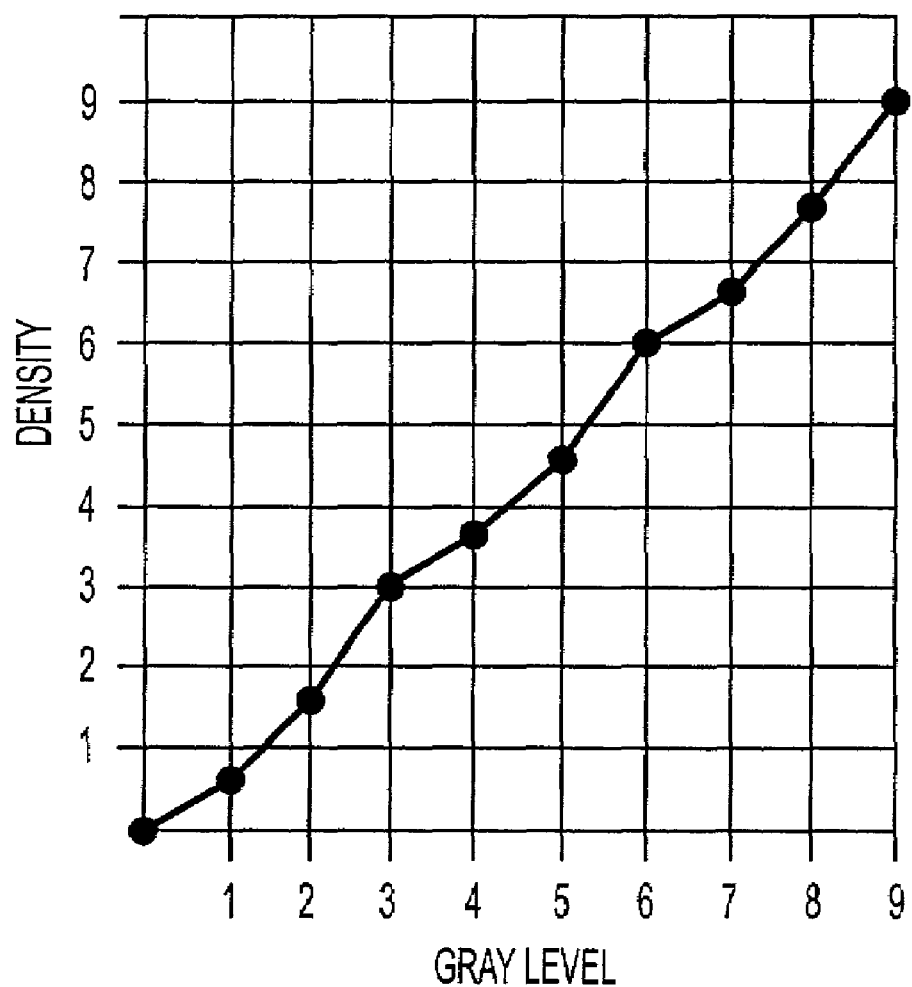
FIG. 16 is a plot of density versus gray level obtained from images produced using the dither matrix shown in FIG. 13.

When a gray level value is inputted to the CPU 51, that gray level value is stored in the gray level value buffer in the RAM 57. The dither pattern converter 55 generates binary image data based on the gray level value stored in the buffer and the dither matrix stored in the ROM 56. The CPU 51 generates pulses as laser control signals (FIG. 15) and transmits the signals to the laser emitter 54. As shown in FIG. 15, the pulse width of a laser control signal becomes longer as the number of dots to be formed increases. The laser emitter 54 emits a laser beam based on the laser beam control signals. As described above, when the photosensitive drum 21 is irradiated with a laser beam, an electrostatic latent image is formed on the surface of the photosensitive drum 21. Toner adheres to the electrostatic latent image and then the toner is transferred to the sheet 3. Thereby, an image of densities corresponding to the gray level values is formed on the sheet 3.

FIG. 5 shows dot forming states in accordance with the gray level values in the dither patterns of the dither matrix shown in FIG. 4. A gray level value ranging from 0 to 9 is assigned to each dither pattern and a dot or dots are formed in each dither pattern according to the gray level value. As shown in FIG. 5a, when the gray level is zero, no dots are formed. As shown in FIGS. 5a through 5d, when the gray level is from 1 to 3, irradiation of a laser beam is performed with reference to the 1st to 3rd areas in the first row of each dither pattern and a dot is formed in the corresponding area or areas of the first row. As shown in FIG. 5d, when the gray level is 3, a laser beam is emitted continuously with reference to the 1st to 3rd areas and, as a result, dots are formed continuously in the 1st to 3rd areas. More specifically, areas on the photosensitive drum 21 corresponding to the 1st to 3rd areas are irradiated with a laser beam, and toner adheres to the irradiated areas. Then, the toner is transferred to the sheet 3, thereby forming dots on the sheet 3.

Figure 5A:
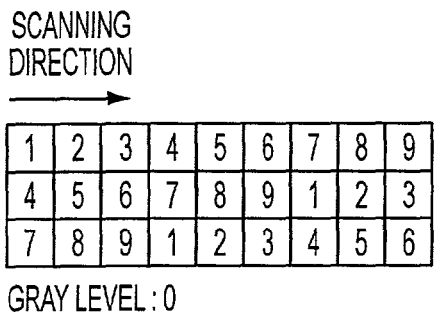
FIGS. 5a–5j show dot forming states in the dither patterns of the dither matrix shown in FIG. 4 when various gray level values are inputted.
Figure 5B:
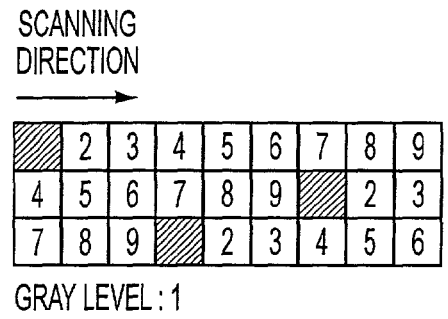
Figure 5C:
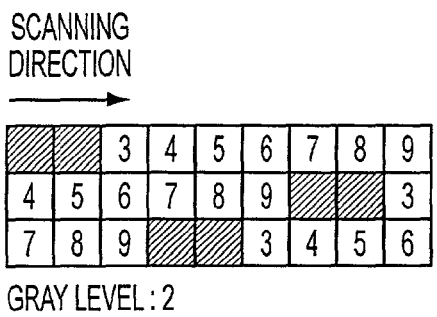
Figure 5D:
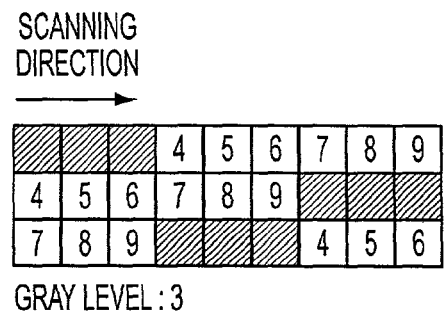
Figure 5E:
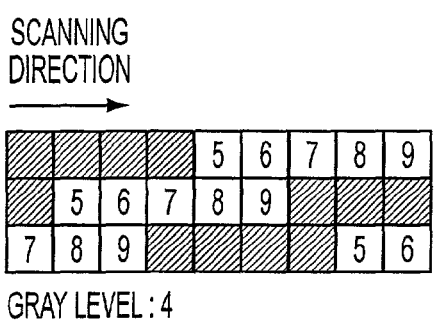

As shown in FIG. 5e, when the gray level is 4, a dot is formed also in the second row. As described above, the 3rd area in a first row of the first dither pattern is adjacent to the 4th area in a second row of the second dither pattern. Thus, a laser beam is emitted continuously with reference to the 1st to 3rd areas of the first dither pattern and the 4th area of the second dither pattern. As a result, a dot is formed in the 4th area of the second dither pattern continuously following dots formed in the 1st to 3rd areas of the first dither pattern.

Figure 5F:
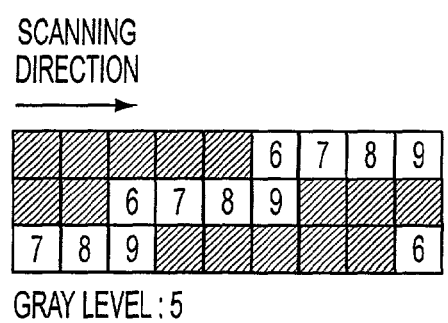
Figure 5G:
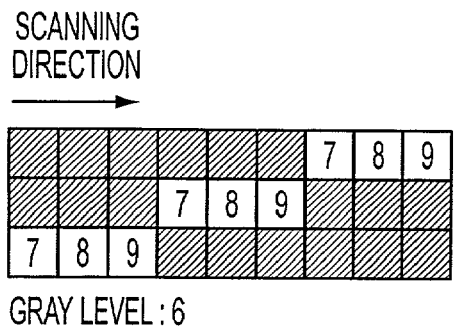

FIGS. 5f and 5g show cases where the gray level is 5 and 6, respectively. Because the 4th area in each dither pattern is continuously aligned with the 5th and 6th areas, a laser beam is emitted continuously with reference to the 1st to 3rd areas of a first dither pattern as well as the 4th and 5th areas or 4th to 6th areas of a second dither pattern. As a result, dots are formed continuously from the 1st area of the first dither pattern to 5th or 6th area of the second dither pattern.

Figure 5H:
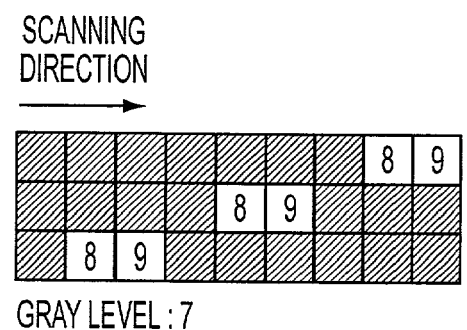

As shown in FIG. 5h, when the gray level is 7, a dot is formed also in the third row. As described above, the 6th area in the second row of a first dither pattern is adjacent to the 7th area in the second row of a second dither pattern. Thus, a laser beam is emitted continuously with reference to the 4th to 6th areas of the first dither pattern and the 7th area of the second dither pattern. As a result, a dot is formed in the 7th area of the second dither pattern continuously following dots formed in the 4th to 6th areas of the first dither pattern.

In addition, the 6th area of the second dither pattern is adjacent to the 7th area of the third dither pattern. Thus, a laser beam is emitted continuously with reference to the 1st area of the first dither pattern through the 7th area of the third dither pattern. As a result, dots are formed continuously from the 1st area to the 7th area.

Figure 5I:
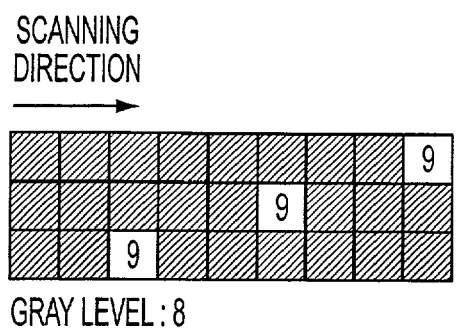
Figure 5J:
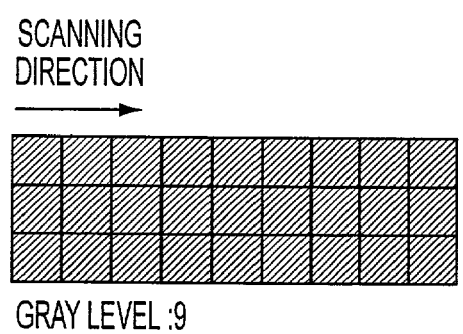

FIGS. 5i and 5j show cases where the gray level is 8 and 9, respectively. Because the 7th area is continuously aligned with 8th and 9th areas in each dither pattern, a laser beam is emitted continuously with reference to the 4th to 6th areas of a first dither pattern as well as the 7th and 8th areas or the 7th to 9th areas of a second dither pattern.

In addition, a laser beam is emitted continuously with reference to the 4th to 6th areas of the second dither pattern as well as the 7th and 8th or the 7th to 9th areas of a third dither pattern. As described above, a laser beam is emitted continuously with reference to the 1st area of the first dither pattern through the 6th area of the second dither pattern. Thus, a laser is emitted continuously with reference to the 1st area of the first dither pattern through the 8th or 9th area of the third dither pattern. As a result, dots are formed continuously from the 1st area to 8th or 9th areas.

As described above, by the use of the dither matrix shown in FIG. 4, an image of any gray level value is produced by continuously emitting a laser beam and by forming dots having the density corresponding to the gray level value.

When the gray level is 4 or 7, conventional laser printers emit a laser beam continuously to form dots up to the 3rd or 6th area and stops emitting a laser beam there, then restart emitting a laser beam to form a dot at the 4th or 7th area. Consequently, an image produced at a gray level of 4 is hardly distinguishable in density from an image produced at a gray level of 3. Likewise, an image produced at a gray level of 7 is hardly distinguishable in density from an image produced at a gray level of 6.

Such a problem is addressed by the dither matrix arranged in accordance with the above-described exemplary embodiment. By the use of the above-described dither matrix, an image is produced at any density corresponding to the gray level ranging from 1 to 9 by a continuous laser beam emission. Therefore, a difference between the density at each gray level and the density at the next higher or lower gray level becomes constant. Thus, an image with smooth gradations of density can be produced.

Figure 6:
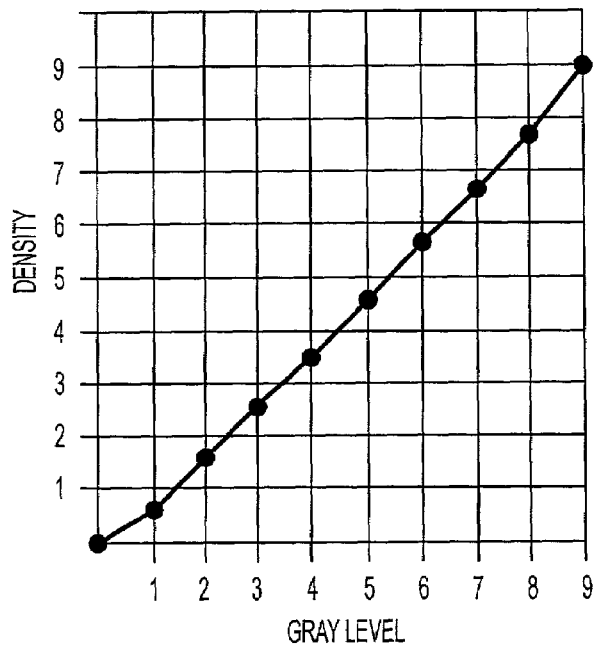
FIG. 6 is a plot of density versus gray level obtained from images produced using the dither matrix shown in FIG. 4.

FIG. 6 is a plot of density versus gray level obtained from images produced by the laser printer 1. As is apparent from FIG. 6, the gradient of a line representing the change rate of the density to the gray level remains substantially the same. In other words, a difference between the density at each gray level and the density at the next higher or lower gray level is substantially constant. Thus, an image with smooth gradations of density can be produced in accordance with the changes in gray level.

Particularly, in the dither matrix according to the exemplary embodiment, a plurality of dither patterns, which are identical in the arrangement of gray level areas, are tiled by shifting one dither pattern from the adjacent dither pattern such that the 3rd area of the first dither pattern becomes adjacent to the 4th area of the second dither pattern and the 6th area of the first dither pattern becomes adjacent to the 7th area of the second dither pattern. Accordingly, a dot is formed in the 4th area of the second dither pattern continuously following a dot formed in the 3rd area of the first dither pattern. Likewise, a dot is formed in the 7th area of the second dither pattern continuously following a dot formed in the 6th area of the first dither pattern.

As a result, the density of an image produced at a gray level of 4 becomes intermediate between the density of an image produced at a gray level of 3 and the density of an image produced at a gray level of 5. The density of an image produced at a gray level of 7 becomes intermediate between the density of an image produced at a gray level of 6 and the density of an image produced at a gray level of 8.

According to the above-described exemplary embodiment, gray level areas in each row in each dither pattern are arranged in the scanning direction in the order of gray levels. A dither matrix is structured by tiling a plurality of dither patterns, which are identical in the arrangement of gray level areas, such that one dither pattern is shifted from the adjacent dither pattern.

With the dither matrix arranged in such a simple manner, an image with smooth gradations of density can be produced.

Although the dither pattern according to the above-described exemplary embodiment is square and has the 1st to the 9th areas arranged in three rows and three columns, there is no limits on the shape of a dither pattern and the number of gray level areas.

Figure 7:
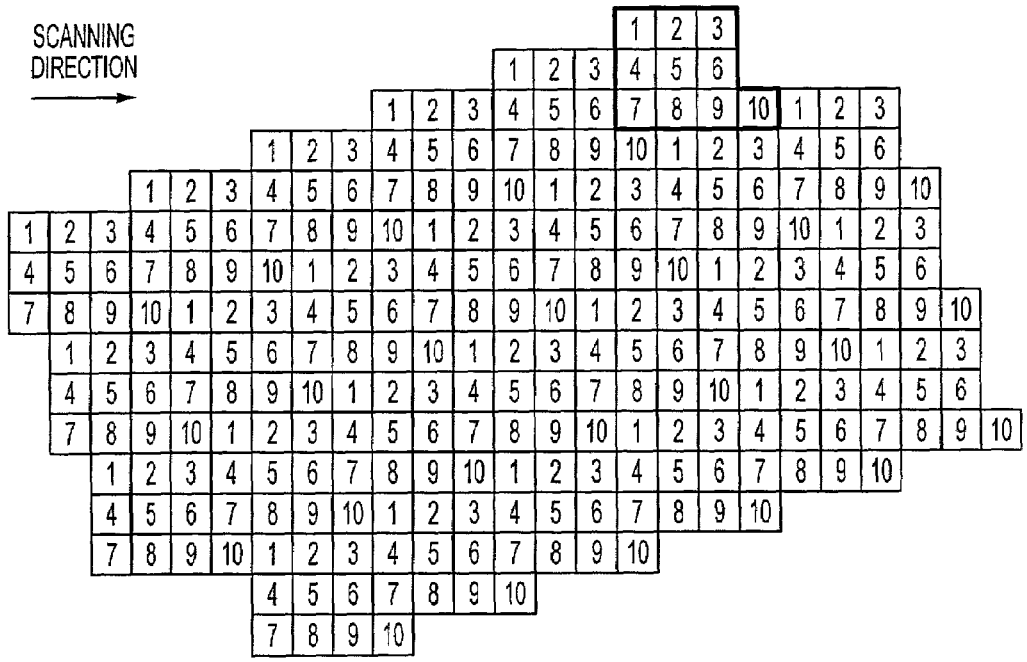
FIG. 7 shows a dither matrix structured by another dither pattern.

In another dither pattern shown in FIG. 7, the 10th area is provided so as to be adjacent to the 9th area in the third row. The dither pattern shown in FIG. 7 is made up of a square, which is divided into the 1st to 9th areas, and a portion extending from the square, which is the 10th area. The 3rd and the 6th areas at the rightmost in the row of one dither pattern are placed to be adjacent to the 4th and 7th areas of another dither pattern, respectively. This arrangement allows a laser beam to be emitted continuously with reference to the 1st through 10th areas. Accordingly, an image with smooth gradations of 10 levels of density can be produced.

Figure 8:
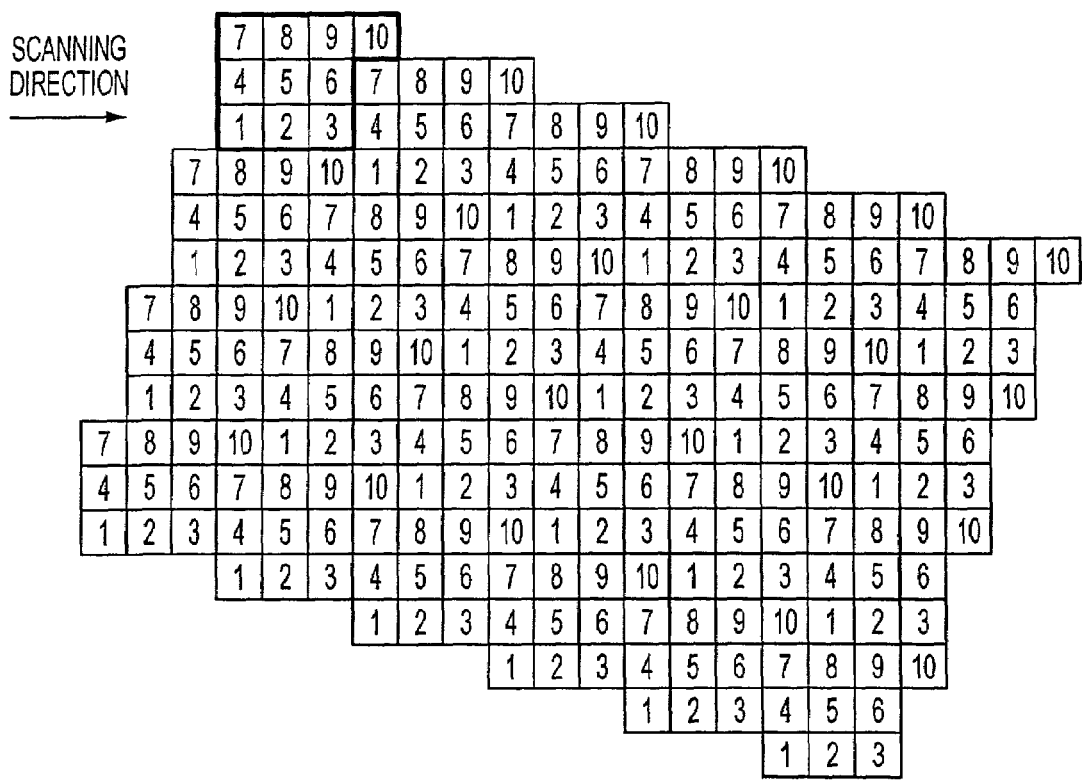
FIG. 8 shows a dither matrix structured by another dither pattern.

FIG. 8 shows another dither pattern, where the first and third rows are vertically reversed compared with the dither pattern shown in FIG. 7. The first row divided into the 1st to 3rd areas is placed at the bottom, the third row divided into the 7th to 10th areas is placed at the top, and the second row divided into the 4th to 6th areas is placed therebetween. As shown in FIG. 8, a dither matrix is structured by tiling such dither patterns such that one dither pattern is shifted from another dither pattern vertically by one row. That is, the 3rd and 6th areas of one dither pattern are placed so as to be adjacent to the 4th and 7th areas of another dither pattern, respectively. This arrangement allows a laser beam to be emitted continuously with reference to the 1st through 10th areas. Accordingly, an image with smooth gradations of 10 levels of density can be produced.

Figure 9:
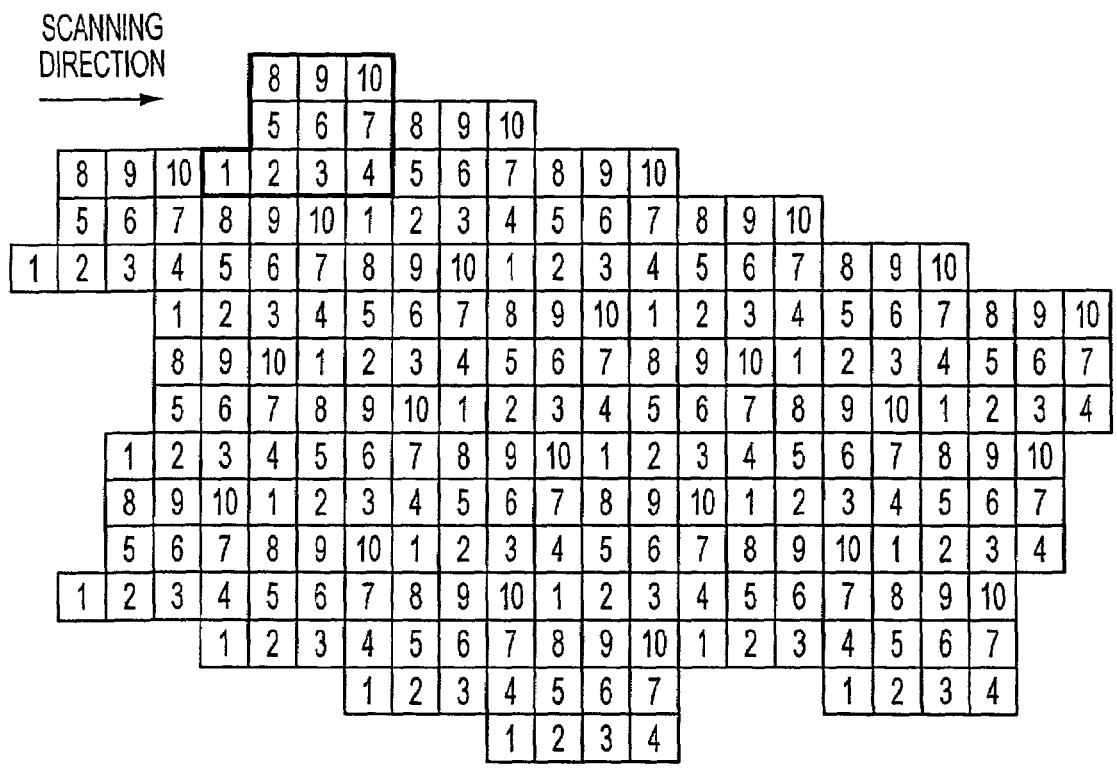
FIG. 9 shows a dither matrix structured by another dither pattern.

Alternatively, in a dither pattern shown in FIG. 9, the first row divided into the 1st to 4th areas is placed at the bottom, the third row divided into the 8th to 10th areas is placed at the top, and the second row divided into the 5th to 7th areas is placed therebetween. The 2nd to 10th areas constitute a square of three rows and three columns, and the 1st area is placed adjacent to the 2nd area. A dither matrix shown in FIG. 9 is structured by tiling the dither patterns such that one dither pattern is shifted from another dither pattern vertically by one row. That is, the 4th and 7th areas of one dither pattern are placed so as to be adjacent to the 5th and 8th areas of another dither pattern, respectively. This arrangement allows a laser beam to be emitted continuously with reference to the 1st area through 10th area. Accordingly, an image with smooth gradations of 10 levels of density can be produced.

Figure 10:
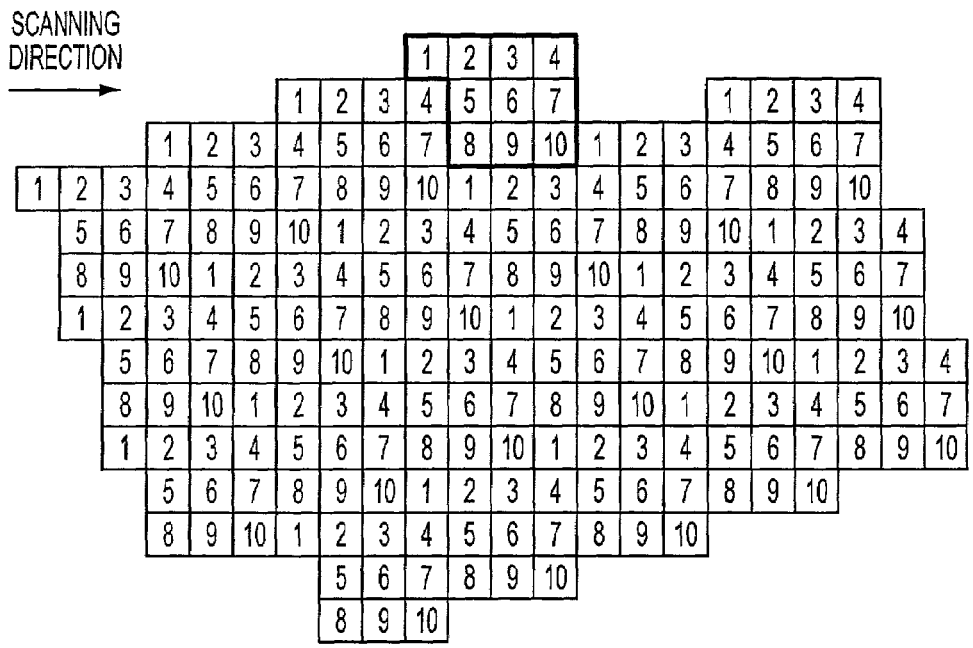
FIG. 10 shows a dither matrix structured by another dither pattern.

FIG. 10 shows another dither pattern. The first and third rows are vertically reversed compared with the dither pattern shown in FIG. 9. The first row divided into the 1st to 4th areas is placed at the top, the third row divided into the 8th to 10th areas is placed at the bottom, and the second row divided into the 5th to 7th areas is placed therebetween. The 2nd to 10th areas constitute a square of three rows and three columns, and the 1st area is adjacent to the 2nd area. A dither matrix shown in FIG. 10 is structured by tiling the dither patterns such that one dither pattern is shifted from another dither pattern vertically by one row. That is, the 4th and 7th areas of one dither pattern are placed so as to be adjacent to the 5th and 8th areas of another dither pattern, respectively. This arrangement allows a laser beam to be emitted continuously with reference to the 1st through 10th areas. Accordingly, an image with smooth gradations of 10 levels of density can be produced.

Figure 11:
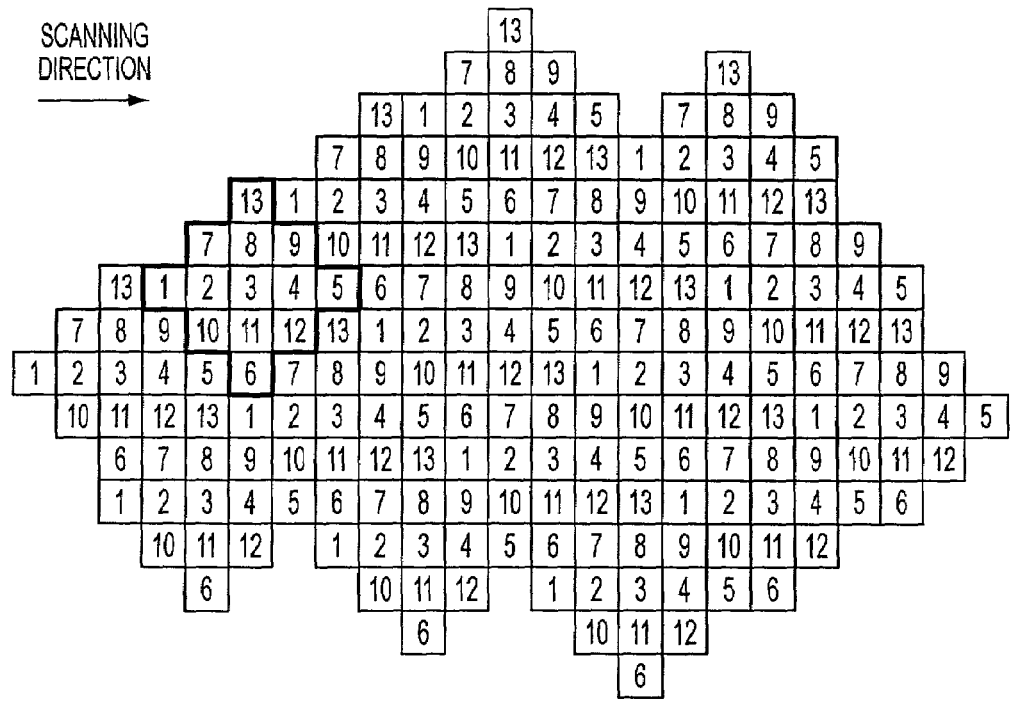
FIG. 11 shows a dither matrix structured by another dither pattern.

While each of the dither patterns shown in FIGS. 7 through 10 has a square of three rows and three columns and an extending portion adjacent to the square, a plurality of extending portions may be provided instead. FIG. 11 shows a dither pattern having a plurality of extending portions. The dither pattern has a square of three rows and three columns and four extending portions, each extending from the center of each side of the square. The dither pattern is divided into the 1st to 13th gray level areas. The 1st to 5th areas are aligned sequentially in the middle row, as the first row. The 7th to 9th areas are arranged, as the third row, directly above the first row, such that the 7th and 9th areas are directly above the 2nd and 4th areas, respectively. Directly below the first row, the 10th to 12th areas are aligned, as the fourth row, such that the 10th to 12th areas are placed directly below the 2nd to 4th areas. The 6th area is placed, as the second row, directly below the 11th area, and the 13th area is placed, as the fifth row, directly above the 8th area.

A dither matrix shown in FIG. 11 is structured by tiling such dither patterns such that one dither pattern is shifted from another dither pattern vertically by two rows. That is, the 5th, 6th, 9th, and 12th areas of one dither pattern are placed so as to be adjacent to the 6th, 7th, 10th, and 13th areas of another dither pattern, respectively. This arrangement allows a laser beam to be emitted continuously with reference to the 1st thorough 13th areas. Accordingly, an image with smooth gradations of 13 levels of density can be produced.

Figure 12:
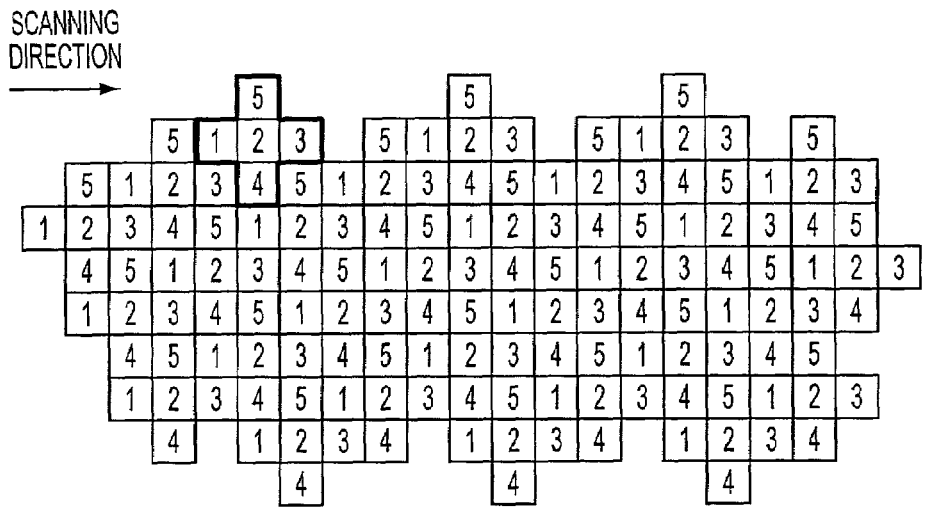
FIG. 12 shows a dither matrix structured by another dither pattern.
Figure 13:
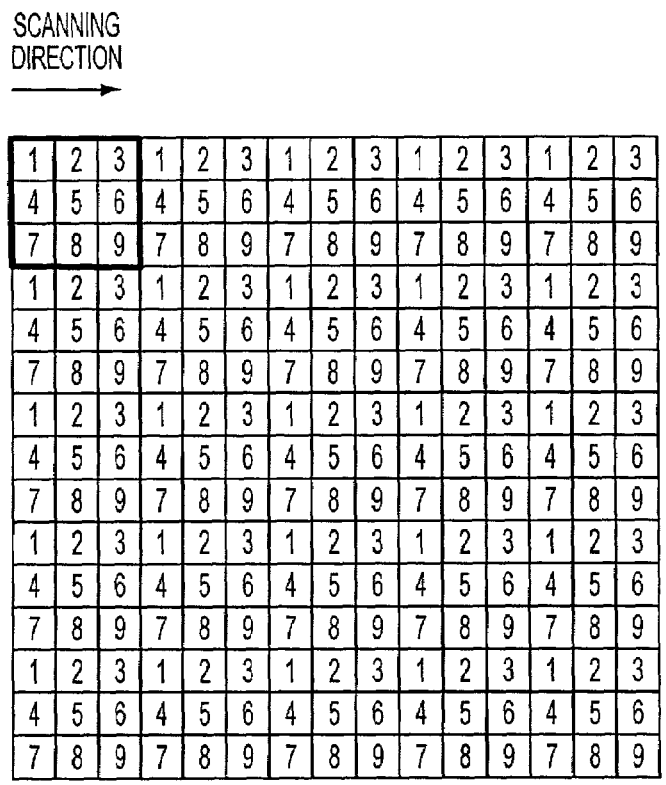
FIG. 13 shows a conventional dither matrix.
Figure 14I:
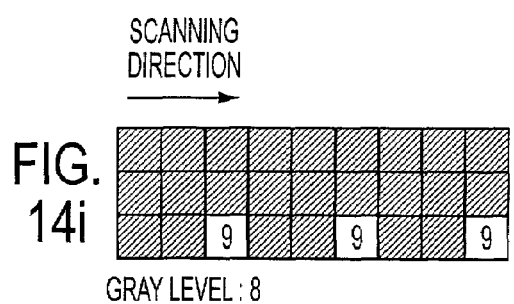
Figure 14J:
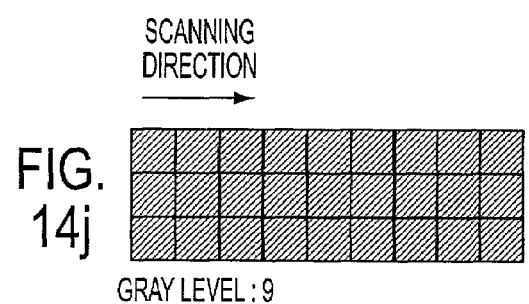

FIG. 12 shows a still another dither pattern in the shape of a cross. The dither pattern is divided into the 1st to 5th gray level areas. More specifically, the 1st, 2nd, and 3rd areas are aligned in this order in the first row of the dither pattern. The 4th area is placed, as the second row, directly below the 2nd area. The 5th area is placed, as the third row, directly above the 2nd area. A dither matrix shown in FIG. 12 is structured by tiling such dither patterns such that one dither pattern is shifted from another dither pattern vertically by one row. That is, the 3rd and 4th areas of one dither pattern are placed so as to be adjacent to the 4th and 5th areas of another dither pattern, respectively. This arrangement allows a laser beam to be emitted continuously with reference to the 1st through 5th areas. Accordingly, an image with smooth gradations of five levels of density can be produced.

As described above, each dither pattern shown in FIGS. 7 through 12 is made up of a rectangular portion and at least one extending portion, and respective dither matrices are structured by tiling such dither patterns such that one dither pattern is vertically shifted from another dither pattern. Consequently, dither patterns in the respective dither matrices are arranged obliquely with respect to the laser scanning direction and a direction perpendicular to the laser scanning direction.

In the laser printer 1, variations in the conveying speed of the sheet 3 may occur due to errors in manufacturing and mounting various parts. Although the laser printer 1 is designed to convey the sheet 3 at a constant speed, the sheet conveying speed may vary even in the same sheet.

When a dither matrix is structured, as shown in FIG. 4, by tiling square dither patterns such that one dither pattern is shifted from another dither pattern by one row, respective gray level areas are aligned in the direction perpendicular to the laser beam scanning direction, that is, the sheet conveying direction. If the sheet conveying speed undesirably varies during printing by the use of such a dither matrix, dots may be formed close to each other or away from each other in the sheet conveying direction and, as a result, streaks may appear in an printed image. More specifically, when the sheet conveying speed is temporarily increased, the distance between dots becomes great and a portion without toner may appear as a streak. On the other hand, when the sheet conveying speed is temporarily reduced, the distance between dots become small and toner adheres in an overlapping manner. As a result, a high-density portion may appear as a streak.

In contrast, printing by the use of any one of the dither matrices, shown in FIGS. 7 through 12, is unlikely to be affected by variations in the sheet conveying speed. Because dither patterns in each dither matrix are arranged obliquely with respect to the laser beam scanning direction and the direction perpendicular to the laser beam scanning direction, dots are formed obliquely without being close to each other or away from each other regularly in the sheet conveying direction.

Although in the above-described embodiment, the invention is applied to a laser printer, the invention may be applied to either monochrome or color printers, regardless of the type of printer, such as a wire dot printer, an inkjet printer, and a thermal head printer. Furthermore, the invention may be applied to any device that can form an image, such as a copier equipped with a printer and a facsimile machine equipped with a printer.

What is claimed is:

1. A method of forming an image, comprising:
    forming a dither matrix that has a plurality of predetermined patterns, each of the plurality of predetermined patterns having a plurality of tiled elements with each tiled element having a threshold value;
    offsetting each of the predetermined patterns when forming the dither matrix such that a first predetermined pattern is offset from a second predetermined pattern; and consecutively filling the predetermined patterns in accordance with an order of the predetermined patterns to create a desired shade, wherein the predetermined patterns are arranged such that at least a shade level at an end of a row of the first predetermined pattern, that is referred to first for scanning, is adjacent to a next higher shade level of the second predetermined pattern.

2. The method of claim 1, wherein the dither matrix is structured by orderly tiling a plurality of dither patterns.

3. The method of claim 1, wherein shade level areas in each predetermined pattern in the dither matrix are arranged sequentially in a scanning direction corresponding with shade levels.

4. The method of claim 1, wherein the predetermined patterns are identical in an arrangement of shade level areas, with the first predetermined pattern shifted from the second predetermined pattern.

5. The method of claim 1, wherein shade level areas in each row in each predetermined pattern are aligned sequentially in a scanning direction corresponding with shade levels.

6. The method of claim 1, wherein the predetermined patterns are arranged so that a shade level area at a head of a row that is referred to first for scanning is adjacent, in a direction perpendicular to a scanning direction, to a shade level area at a head of a row that is referred to next.

7. The method of claim 1, wherein each of the predetermined patterns includes a rectangular portion made up of rectangularly arranged shade level areas, and at least one portion extending from the rectangular portion and made up of at least one shade level area.

8. The method of claim 1, wherein the shading applies to both monochrome and color images and to a density of both monochrome and color images.

9. An apparatus for forming an image, comprising:
an image forming device, wherein the image forming device forms a dither matrix that has a plurality of predetermined patterns, each of the plurality of predetermined patterns having a plurality of tiled elements with each tiled element having a threshold value, which are consecutively filed in accordance with an order of the predetermined patterns to create a desired shade, with each predetermined pattern offset when forming the dither matrix such that a first predetermined pattern is offset from a second predetermined pattern, and the predetermined patterns are arranged such that at least a shade level at an end of a row of the first predetermined pattern, that is referred to first for scanning, is adjacent to a next higher shade level of the second predetermined pattern.

10. The apparatus of claim 9, wherein the dither matrix is structured by orderly tiling a plurality of dither patterns.

11. The apparatus of claim 9, wherein shade level areas in each predetermined pattern in the dither matrix are arranged sequentially in a scanning direction corresponding with shade levels.

12. The apparatus of claim 9, wherein the predetermined patterns are identical in an arrangement of shade level areas with the first predetermined pattern shifted from the second predetermined pattern.

13. The apparatus of claim 9, wherein shade level areas in each row in each predetermined pattern are aligned sequentially in a scanning direction corresponding with shade levels.

14. The apparatus of claim 9, wherein the predetermined patterns are arranged so that a shade level area at a head of a row that is referred to first for scanning is adjacent, in a direction perpendicular to a scanning direction, to a shade level area at a head of a row that is referred to next.

15. The apparatus of claim 9, wherein each of the predetermined patterns includes a rectangular portion made up of rectangularly arranged shade level areas, and at least one portion extending from the rectangular portion and made up of at least one shade level area.

16. The apparatus of claim 9, wherein the shading applies to both monochrome and color images and to a density of both monochrome and color images.

17. A computer readable medium that stores a program for forming a dither pattern, the program comprising:
a routine for establishing a number of gradations of print;
a routine for establishing a tile block having a number of areas equal to the number of gradations, the tile block having at least a center square block;
a routine for numbering the areas of the tile block;
a routine for offsetting adjacent tile blocks such that an area of at least one row of a first tile block and an area of a row of a second offset tile block are numbered sequentially; and
a routine for consecutively filling the tile blocks in accordance with an order of the tile blocks to create a desired shade, wherein the tile blocks are arranged such that at least a shade level at an end of a row of the first tile block, that is referred to first for scanning, is adjacent to a next higher shade level of the second offset tile block.

18. The medium according to claim 17, wherein the center square block has nine areas in a three by three matrix and the tile block is further formed with at least one additions area extending from a top or bottom row of the matrix.

19. The medium according to claim 17, wherein the center square block has nine areas in a three by three matrix and the tile block is further formed with an area at each end of a center row and a center column of the matrix.

20. The medium according to claim 17, wherein the center square block is a single area and the tile block is formed as a cross with an area extending from each side of the single area.

* * * * *